United States Patent
Hahn

(10) Patent No.: US 7,437,154 B2
(45) Date of Patent: Oct. 14, 2008

(54) HETEROGENEOUS MOBILE RADIO SYSTEM

(75) Inventor: Wolfgang Hahn, Bergfelde (DE)

(73) Assignee: Siemens Aktiengesellschaft, Munich (DE)

( * ) Notice: Subject to any disclaimer, the term of this patent is extended or adjusted under 35 U.S.C. 154(b) by 65 days.

(21) Appl. No.: 10/475,668

(22) PCT Filed: Mar. 27, 2002

(86) PCT No.: PCT/DE02/01144

§ 371 (c)(1),
(2), (4) Date: Mar. 22, 2004

(87) PCT Pub. No.: WO02/087160

PCT Pub. Date: Oct. 31, 2002

(65) Prior Publication Data

US 2004/0166843 A1    Aug. 26, 2004

(30) Foreign Application Priority Data

Apr. 24, 2001 (DE) .................... 101 20 772

(51) Int. Cl.
*H04Q 7/20* (2006.01)
*H04Q 7/24* (2006.01)
(52) U.S. Cl. .............. 455/426.2; 455/445; 370/328; 370/338; 370/352
(58) Field of Classification Search .......... 455/466, 455/432.1, 435.1, 414.1, 414.2, 414.3, 414.4, 455/456.1, 456.2; 370/328, 401, 338, 442, 370/465, 522
See application file for complete search history.

(56) References Cited

U.S. PATENT DOCUMENTS 5,325,362 A * 6/1994 Aziz .................... 370/405
(Continued)

FOREIGN PATENT DOCUMENTS

EP    0 917 320    5/1999
(Continued)

OTHER PUBLICATIONS

Akyildiz et al. "Mobility Management in Current and Future Communications Networks" IEEE Network, Jul./Aug. 1998, pp. 39-49.
(Continued)

*Primary Examiner*—Erika A Gary

(57) ABSTRACT

The invention relates to a heterogeneous mobile radio system (1) for providing services from a packet data network for a mobile terminal (MT) (7). Said system comprises at least one first mobile radio network (2) and one second mobile radio network (3). Said mobile radio networks (2, 3) respectively comprise at least one access node (4, 5) to the packet data network, and the access node (5) of the second mobile radio network (3) can only be indirectly connected to the packet data network via the access nodes (4) of the first mobile radio network (2). The invention also relates to a method for providing services from a packet data network for a mobile terminal (7) of a mobile radio system, said method comprising the following steps: (a) at least one first (2) and one second (3) mobile radio network respectively comprising at least one access node (4, 5) to the packet data network are provided; and (b) the mobile radio networks (2, 3) are combined in such a way that data packets can only be indirectly transported between the second mobile radio network (3) and the packet data network via the access nodes (4) of the first mobile radio network (2). The invention further relates to a mobile terminal (7) for using a heterogeneous mobile radio system comprising at least one first mobile radio network (2) and one second mobile radio network (3). Said mobile terminal (7) can simultaneously maintain connections to the first (2) and the second (3) mobile radio networks.

8 Claims, 1 Drawing Sheet

U.S. PATENT DOCUMENTS

| | | | |
|---|---|---|---|
| 6,272,129 B1* | 8/2001 | Dynarski et al. | 370/356 |
| 6,351,653 B1* | 2/2002 | Alberth et al. | 455/552.1 |
| 6,408,173 B1* | 6/2002 | Bertrand et al. | 455/406 |
| 6,546,247 B1* | 4/2003 | Foti et al. | 455/433 |
| 6,603,761 B1* | 8/2003 | Wang et al. | 370/352 |
| 6,708,034 B1* | 3/2004 | Sen et al. | 455/445 |
| 6,711,147 B1* | 3/2004 | Barnes et al. | 370/338 |
| 6,738,362 B1* | 5/2004 | Xu et al. | 370/329 |
| 6,845,153 B2* | 1/2005 | Tiburtius et al. | 379/221.01 |
| 6,865,169 B1* | 3/2005 | Quayle et al. | 370/335 |
| 6,904,025 B1* | 6/2005 | Madour et al. | 370/328 |
| 6,992,994 B2* | 1/2006 | Das et al. | 370/328 |
| 7,174,018 B1* | 2/2007 | Patil et al. | 380/258 |
| 2002/0080752 A1* | 6/2002 | Johansson et al. | 370/338 |
| 2002/0147008 A1* | 10/2002 | Kallio | 455/426 |
| 2002/0147824 A1* | 10/2002 | Hurtta et al. | 709/230 |
| 2003/0039237 A1* | 2/2003 | Forslow | 370/352 |
| 2006/0104284 A1* | 5/2006 | Chen | 370/395.3 |

FOREIGN PATENT DOCUMENTS

| | | |
|---|---|---|
| EP | 0 924 914 | 6/1999 |
| EP | 0 936 777 | 8/1999 |
| EP | 1 047 279 | 10/2000 |
| EP | 1 052 825 | 11/2000 |
| JP | 11252183 | 9/1999 |
| JP | 11355322 | 12/1999 |
| JP | 2000224233 | 8/2000 |
| WO | WO 00/42755 | 7/2000 |
| WO | WO 00/76145 | 12/2000 |
| WO | WO 01/99466 | 12/2001 |

OTHER PUBLICATIONS

Pahlavan et al. "Handoff in Hybrid Mobile Data Networks" IEEE Personal Communications Apr. 2000, pp. 34-46.

Krishnamurthy et al. "Handoff in 3G Non-Homogeneous Mobile Data Networks" MTT-S European Wireless 1998 (online), Oct. 1998.

* cited by examiner

HETEROGENEOUS MOBILE RADIO SYSTEM

TECHNICAL FIELD OF THE INVENTION

The present invention relates to a heterogeneous mobile radio system, and in particular, having at least one first and one second mobile radio network, with each of the two mobile radio networks each having an access node to a packet data network.

BACKGROUND OF THE INVENTION

Public mobile radio networks, in particular 2G/3G networks, are designed to offer services in parts of the country distributed as widely as possible. In this case, a situation can occur in which the available capacity for the demanded services is not adequate in certain regions, i.e. in certain cells, and in particular when there is a high subscriber density within these regions or cells. The problem is further exacerbated by the capabilities being provided for new services with wide bandwidths, such as multimedia, by means of the mobile access systems to the Internet, for example by means of the packet data service GPRS (General Packet Radio Service) in mobile radio networks based on the GSM Standard or UMTS (Universal Mobile Telecommunications System).

The problem is worse in locations and buildings such as airports or exhibition halls, in which it can generally also be assumed that the subscribers are moving at a relatively slow speed. In this case, by way of example, the two approaches described in the following text could lead to a solution to this problem.

It would be feasible to install very small cells, that is to say microcells or picocells, using the same technology as the overall network, for example in conjunction with overlay or umbrella cells. With this procedure, the subscriber would not notice any sign of the intervention, i.e. the installation of additional cells in the overall network, i.e. the installation would be completely transparent to the mobile radio network subscribers. Furthermore, the installation of such very small cells would fit seamlessly into the operating concept of the mobile radio network operator. There would be no transmission losses or undesirable interruptions in transmission. Furthermore, in general, no special measures would be required for charging and/or authentication of the corresponding mobile radio network subscribers. However, the installation of such very small cells in the overall system would be very expensive, involving very expensive radio technology since a very high degree of mobility is supported. Furthermore, possibly, the network could be heavily loaded with signaling traffic, since the small cells would lead to a large number of handovers between the cells. In this case, the radio technology could be constrained by its limits, in particular with regard to the transmission frequencies.

Furthermore, it would be feasible to install an alternative wire-free access system to the Internet. By way of example, this could be a wireless LAN (Local Area Network), Bluetooth or similar systems. The advantage in this case would be that it would actually create additional transmission capacity. Furthermore, the installation of such alternative systems is in general not as costly as the installation of very small cells that have been mentioned. However, one disadvantageous feature is the fact that seamless handovers from the 2G/3G mobile radio network to the alternative mobile radio network would be impossible, or feasible only to a restricted extent. This means that losses and interruptions in the transmission could occur. In a situation where, for example, the WLAN (Wireless LAN) is associated with a different network operator than the 2G/3G mobile radio network, the subscriber must authenticate himself for a second time with the WLAN, i.e. the installation of an alternative mobile radio network is not transparent to the subscriber. If, on the other hand, the WLAN is operated by the same network operator as the 2G/3G mobile radio network, then this network operator would at least have to introduce new methods for authentication and for charging for operation, and this would increase the operating costs of the system.

Until now, solutions on IP layers have normally been chosen, in order to create heterogeneous mobile radio systems such as a combination of a 2G/3G mobile radio network with a WLAN, providing IP traffic. The expression IP layer in this case refers to protocols in the Internet Protocol (IP) family which are independent of the transmission technique (for example LAN or WAN) and the access technique (mobile radio, landline network). One of the most widely discussed solutions in this case is mobile IP corresponding, for example, to RFC2002 for IP-v4. The Internet access in 3GPP 2G/3G networks is generally provided on the basis of 3GPP TS23.060. Access nodes (GGSN: Gateway GPRS Support Nodes) are in this case provided which in each case provide access to the Internet and support the appropriate Internet Protocol (IP). In this case, a fixed reference point for the Internet is provided at the GGSN, at which each subscriber can be accessed using an IP address. Within the core network, that is to say within the actual mobile radio network, the mobility between the access network nodes (GGSN) and the existing service network nodes (Service GPRS Support Node: SGSN) is provided via GTP tunneling. The entire connection between a mobile terminal (MT) and the access node GGSN together with the control data that describes the connection is referred to as a packet data protocol (PDP) context. A subscriber can be accessed by corresponding subscribers via a fixed IP address which is made available to him, for example, by an Internet Service Provider (ISP). When this subscriber now registers in a 2G/3G network, he is provided with a preferably dynamic IP address by an Internet Service Provider. In this case, this Internet Service Provider and the mobile radio operator of the 2G/3G network may be organizationally identical. The following procedure would be required for a subscriber to change between the 2G/3G network and the WLAN by means of mobile IP: the subscriber must register with his home agent in the Internet from the 2G/3G mobile radio network using his IP address. This Home Agent (HA) may be provided by a second (home) ISP. The subscriber can be accessed at this HA via a fixed IP address or via some other identification in the network of the second ISP. The data packets are then tunneled via a mobile IP (MIP) tunnel from the home agent to the access node GGSN for the IP address for the subscriber in the 2G/3G mobile radio network. In order to ensure that the packets are passed to the mobile terminal (MT) of the subscriber, a foreign agent (FA) must be provided in the GGSN in order to cancel the encapsulation of the packets tunneled to that GGSN and to send them to the mobile terminal with a fixed associated home address. When the subscriber registers in the WLAN and there is likewise a foreign agent (FA) in a WLAN controller which is acting as the access node to the Internet, then the home agent in the Internet can also pass on the packets by means of mobile IP (MIP) directly into the WLAN controller. The advantage of this solution is that the subscriber can keep his IP address when changing between systems, so that there is no need to interrupt many applications. However, as already mentioned initially, it has the disadvantage that new methods and/or measures for access authorization control and charging would need to be introduced or implemented in the area of the WLAN. If the possibility of changing between the two mobile radio networks and the two access systems, as described here between a 2G/3G mobile radio network and a WLAN, were to be offered as a service by the network operator of the 2G/3G mobile radio network, this operator would also have to provide the home agent as well as home IP addresses for his subscribers. This is because the home agent controls and provides routings for the packets to the MT. Furthermore, the subscriber identifications and charging data for the respective networks must be correlated. This therefore leads to considerable operator complexity. Furthermore, it would possibly lead to longer switching times owing to the protocol, because registration data and authentication data would need to be interchanged between the MT, FA and servers for authentication, authorization and charging (AAA) and HA. Furthermore, longer switching times can result if there is a long distance between the home agent and the local area networks in which the mobile subscriber is located.

WO 00/76145 A1 discloses a heterogeneous mobile radio system, with a GPRS network being connected to a local network and in which case GPRS services can be made accessible to the local area network by means of a specific network element.

SUMMARY OF THE INVENTION

The invention provides a mobile radio system which at least has the advantages of both approaches that have been mentioned, but at the same time overcomes their disadvantages.

In one embodiment of the invention, there is a heterogeneous mobile radio system for provision of services from a packet data network for a mobile terminal (MT) is provided, having at least one first mobile radio network and one second mobile radio network, with the mobile radio networks each having at least one access node to the packet data network, and in which case the access node for the second mobile radio network can be connected to the packet data network only indirectly via the access node for the first mobile radio network.

In one preferred embodiment of the heterogeneous mobile radio system, the packet data network is the public Internet.

According to another embodiment of the invention, at least one first mobile radio network is now combined with a second mobile radio network, with both mobile radio networks each having at least one access node to a packet data network, preferably to the Internet. In the situation where the first mobile radio network is a 2G/3G mobile radio network, the access node is formed by a GGSN (Gateway GPRS Support Node). In the second mobile radio network, for example a WLAN, the access node with the functions according to the invention is referred to as a Local Mobility Agent (LMA). Via an IP router function, these access nodes represent an interface to a packet data network, preferably to the landline IP network, and act as access routers, that is they terminate mobile radio and access technique-specific protocols. IP protocols, in particular mobile IP (MIP), can also advantageously be used for this purpose. According to the invention, the access node for the second mobile radio network is now not connected directly to the packet data network, preferably the Internet, but all the data is tunneled via the access node to the first mobile radio network. In one aspect of the invention, at least one agent function can be integrated in the access node for the first mobile radio network. In one preferred embodiment of the mobile radio system according to the invention this is a home agent function, preferably a routing function.

The routing function is therefore moved from the packet data network, preferably the Internet, into the first mobile radio network, preferably into a 2G/3G mobile radio network. This avoids the operation of a home agent in the packet data network or in the Internet, and the allocation of fixed IP addresses in the Internet. The IP address in the mobile radio system can be retained when changing between a first and a second mobile radio network. There is therefore no interruption between the applications, and the routing is considerably improved.

In one preferred embodiment of the heterogeneous mobile radio system according to the invention, the first mobile radio network represents an overlay network for the second mobile radio network. In this case, a supply by the first mobile radio network is also ensured in the supply areas of the second mobile radio network. It is particularly preferable for the first mobile radio network to be a 2G/3G mobile radio network. In this case, a connection between the first mobile radio network and a mobile terminal is not given up even when using the second mobile radio network, that is the mobile terminal is "always on" in the first mobile radio network. Owing to the presence of an overlay network, it is accordingly possible to use one or more functions of the first mobile radio network for the second mobile radio network, as well. For example, an authentication function for the first mobile radio network, preferably a 2G/3G mobile radio network, is also used for a subscriber to the mobile radio system, and a charging function for the first mobile radio network, preferably a 2G/3G mobile radio network, is also used for the second mobile radio network, preferably a WLAN. This has the advantage that the mobile radio system subscribers need not authenticate themselves more than once, that is they need not reauthenticate themselves once again when changing between the two mobile radio networks, even when they wish to use both mobile radio networks. Furthermore, this allows subscribers who have access to the first mobile radio network, preferably to the 2G/3G mobile radio network, to use the services on the second mobile radio network, preferably a WLAN. This may also relate to roamers from other mobile radio networks who have access to the first mobile radio network. Furthermore, a low-cost technique, in particular an Internet technique, can in be used for the second mobile radio network, preferably a WLAN, since this technique need not have any authentication function or any charging function. For the network operator of the mobile radio system, this results in no change, or little change, to the operator or operation concept. The second mobile radio system, preferably a WLAN, can be introduced seamlessly into the overall system, that is to say without any interruption and without any losses. Since the traffic for the second mobile radio network is also passed via the first mobile radio network, there is sufficient information in the first mobile radio network to allow very flexible charging. Thus, for example, a volume of data which is transmitted in the second mobile radio network, preferably a WLAN, can be charged for in an identical way to a volume of data which is transmitted in the first mobile radio network, preferably a 2G/3G mobile radio network. Furthermore, it may, however, also be at no charge, or may be charged at the tariff of an Internet service provider. In the latter case, this allows any desired legal demands or business cases to be satisfied. Authentication and authorization of a subscriber for use of the second mobile radio network can be carried out in the first mobile radio network by carrying out the registration process for the second mobile radio network via the first mobile radio network, and by the access node for the first mobile radio network comparing the subscriber address (IP) to be registered for a match with the IP address of the subscriber in the first mobile radio network, and checking for the presence of a corresponding PDP context in the first mobile radio network.

In a further preferred embodiment of the heterogeneous mobile radio system, when using a home agent function, in particular a mobile IP home agent function, data which can be specified can be selectively transmitted only via the second mobile radio network.

When using the GTP protocol, the data path between the access node for the second mobile radio network and for the first mobile radio network can be implemented by a generalization of the existing "secondary PDP context" concept of GPRS, with the packet distribution function for secondary PDP contexts being used in order to distribute data traffic between the first mobile data network and the second mobile radio network, as well, in which case the tunnels, when seen from the GGSN, may have different destination addresses.

Furthermore, when using the mobile IP home agent function in the access node for the first mobile radio network, this does not just switch all of the traffic between the first mobile radio network and the second, but it is also possible to pass specific data records via the second mobile radio network, in accordance with any traffic classification which may be provided. This corresponds to an extension of MIP.

Furthermore, the mobile IP registration can be extended for signaling of the setting up of a connection between the access node for the second mobile radio network and for the first mobile radio network. Specifically, this may occur by session-specific data for the PDP context for the first mobile radio network, for example by subscriber and context identities, and by session-specific data for setting up the tunnels between the access node for the second mobile radio network and for the first mobile radio network, such as data stream characteristics for traffic classification as in the TFT for GPRS. It is thus possible, for example, to use the second mobile radio network for voice over IP or multimedia connections, while the first mobile radio system can be used for the rest of the data traffic.

The first access node advantageously provides coupling between the PDP context for the second mobile radio network and a context in the first mobile radio network. Furthermore, it preferably allows the context in the second mobile radio network when there is at least one context in the first mobile radio network.

A control function is preferably provided in the access node for the second mobile radio network, and causes data packets which are to be sent from the second mobile radio network to be transported exclusively to the access node for the first mobile radio network. This can be achieved, for example, by using specific IP addresses for the tunnel end points between the first and the second mobile radio network. Furthermore, specific address allocation techniques can be used for mobile subscribers in the second mobile radio network. In addition, this can also be monitored by a test for predefined access addresses of the tunnel destination address of the access node for the first mobile radio network in the access node for the second mobile radio network.

The second mobile radio network may be operated by the operator of the first mobile radio network, or else by a different operator. Even in the second case, the operator of the second mobile radio network need not carry out any subscriber management, that is need not provide any authentication function or subscriber charging. A type of interoperator charging can be carried out for billing purposes with the operator of the first mobile radio network, for example for the entire volume of data which is transported for the network operator of the first mobile radio network.

In a situation where a 2G/3G mobile radio network, as the first mobile radio network, is combined with a WLAN mobile radio network, as the second mobile radio network, the entire connection from a mobile terminal (MT) to a GGSN in the 2G/3G mobile radio network, including the connection via the WLAN, can be implemented as an extension to the GPRS secondary PDP context. This is regarded as being the capability of a mobile terminal to set up two or more connections to the GGSN using one IP address. These connections may then differ in particular in the quality of service (QoS), such as the guaranteed bandwidth. For example, it is possible to handle standard Internet traffic such as WEB browsing and e-mail in a first context, and to handle a voice over IP telephony connection in a second (secondary) context. This results in only a small number of technical changes, for example in the GGSN, for the 2G/3G mobile radio network.

The heterogeneous mobile radio system according to the invention does not require any new protocols and can operate with already known protocols such as MIP and/or GTP. In particular, the control between a mobile terminal and the respective access node can be carried out exclusively using mobile IP. This allows control using standard IETF techniques, and no system-specific changes are required.

Since, in the situation where the mobile radio network is an overlay network for the second mobile radio network, the connection between the first mobile radio network and a mobile terminal is not given up even when using the second mobile radio network, it is still possible to transmit security-relevant or safety-relevant data via the first mobile radio network. While, for example, Internet downloads are carried out via the second mobile radio network, preferably a WLAN, the asymmetry of the traffic in the downlink direction is also carried out by the first mobile radio network, preferably a 2G/3G mobile radio network.

The present invention also relates to a corresponding method for provision of services from a packet data network for a mobile terminal in a mobile radio system, with the method having at least the following:

a. provision of at least one first and one second mobile radio network, each having at least one access node to the packet data network;

b. combination of the mobile radio networks such that data packets can be transported between the second mobile radio network and the packet data network only indirectly via the access node for the first mobile radio network.

Data packets which are to be sent from the second mobile radio network are preferably transported by means of a control function in the access node for the second mobile radio network, exclusively to the access node for the first mobile radio network.

The invention also seeks to provide a mobile terminal for use of a heterogeneous mobile radio system having at least one first mobile radio network and one second mobile radio network.

In another embodiment of the invention, there is a mobile terminal for use of a heterogeneous mobile radio system having at least one first mobile radio network and one second mobile radio network, in which case the mobile terminal can simultaneously maintain connections to the first and to the second mobile radio network.

The mobile terminal can preferably selectively transmit data via the first and/or via the second mobile radio network.

A subscriber to the heterogeneous mobile radio network advantageously maintains a connection simultaneously in the first and in the second mobile radio network. In consequence, no data can be lost when a handover occurs. The data relaying function that is normally otherwise used for this purpose during a handover in the mobile radio network is not required here, since the mobile terminal can carry out this function. The switching of data streams from the first mobile radio network to the second mobile radio network and vice versa are such that the transmission end is signaled in the respective mobile radio network, in order to make it easier for the mobile terminal to protect the sequence of the data.

In a further preferred embodiment of the mobile terminal, data streams which are transported via the first and second mobile radio network can be combined in the mobile terminal.

Data streams which are transported via the first and the second mobile radio network are preferably combined in the mobile terminal. This considerably reduces the handover function in the mobile radio system. Since the connection between the first mobile radio network and the mobile terminal is preferably not given up, a partial handover takes place between the first and the second mobile radio network, as a result of which the amount of data which needs to be transmitted between the mobile radio networks is minimal, and the handover signaling is greatly simplified.

The subject matter of the invention relates essentially to the embedding of a second alternative mobile radio network in a first mobile radio network, preferably in a 2G/3G mobile radio network such as the GPRS.

In summary, the advantages of the present invention are, in particular, that the heterogeneous mobile radio system according to the invention results in a partial handover between the mobile radio networks. The handover functions are moved to the mobile terminal. The invention allows a generalization of the concept of the secondary PDP context to be implemented. Furthermore, a home agent function is preferably combined with an access node, preferably with a GGSN. Furthermore, according to the invention, a control function is preferably combined with the access node for the second mobile radio network, forcing the data packets to be routed to the access node for the first mobile radio network.

BRIEF DESCRIPTION OF THE DRAWINGS

Further advantages of the heterogeneous mobile radio system according to the invention and of the method according to the invention will be explained with reference to the following figures, in which.

DETAILED DESCRIPTION OF THE INVENTION

Figure 1:
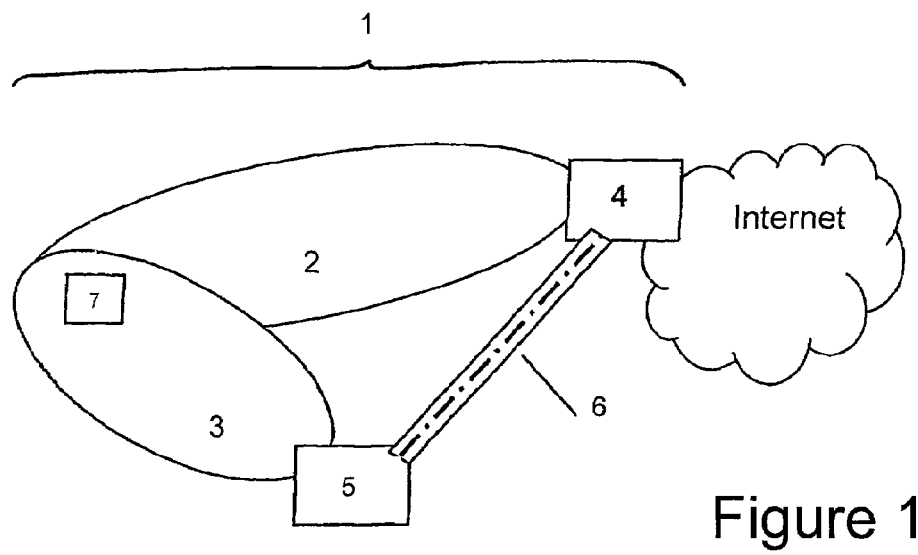
FIG. 1 shows a heterogeneous mobile radio system according to the invention, with a connection for the Internet.

FIG. 1 shows a heterogeneous mobile radio system 1 according to the invention, which has a first mobile radio network 2, preferably a 2G/3G mobile radio network such as a GSM-GPRS and/or UMTS-GPRS, and a second mobile radio network 3, such as a WLAN. The first mobile radio network 2 has an access node 4, a GGSN in the case of GSM-GPRS and/or UMTS-GPRS, in which a home agent function is integrated. The second mobile radio network 3 likewise has an access node 5. Both access nodes 4, 5 act as access routers. A data tunnel 6 is formed between the access nodes 4 and 5. In order to make it possible to set up this data tunnel 6, a mobile terminal 7 signals the address of the access node 4 for the first mobile radio network 2 to the access node 5 for the second mobile radio network 3. There are several alternatives. First, the access node 4 for the first mobile radio network 2, for example a GGSN, can distribute its address or the home agent address via the first mobile radio network 3, preferably a 2G/3G mobile radio network, using MIP, which is referred to as home agent advertisement, or the mobile terminal 7 can use MIP to check the address, a so-called home agent solicitation. In the latter case, the access node 4, preferably the GGSN, responds to this request with its own address, and does not distribute it any further to other routers. The information interchange between the access node 4 and the mobile terminal 7 may also be carried out using other protocols or protocol extensions. Furthermore, however, the address of the access node 4 may also be a component of the PDP context data that is stored in the mobile terminal 7. It is also feasible for the mobile terminal 7 to know the address of one node (which is serving the terminal 7) in the first mobile radio network 2, but once again to know the address of the access node 4. The mobile terminal 7 sends the address of the node which is serving the terminal 7 to the access node 5, and the latter checks the serving node for the first mobile radio network on the basis of the address of the access node 4.

Figure 2:
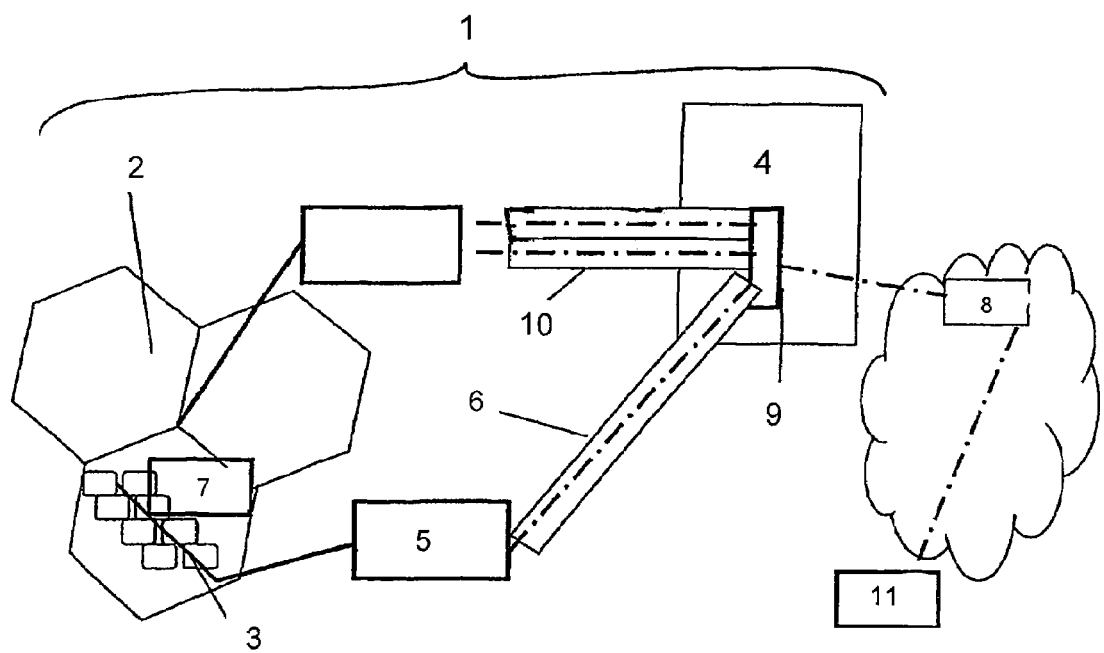
FIG. 2 shows a detailed heterogeneous mobile radio system according to the invention, with a connection for the Internet.

FIG. 2 shows a more detailed illustration of a further heterogeneous mobile radio system according to the invention. Two examples of the mobile radio system according to the invention will now be described in the following text with reference to FIG. 2.

In the first example, a packet distribution function 9 is implemented in an access node 4 for the first mobile radio network 2, preferably in a GGSN, as an extension to the secondary PDP context concept of GPRS. A mobile terminal 7 registers in the first mobile radio network 2, in the illustrated case in a 2G/3G mobile radio network. Furthermore, the mobile terminal 7 has set up at least one PDP context to an Internet service provider 8, from whose address area it receives an IP address (in the following text: IP-mt). This context is regarded as "always on", in order to ensure the accessibility of the mobile terminal 7 and to make it possible to interchange at least signaling messages for specific services with the Internet. The mobile terminal 7 can set up further secondary PDP contexts for the same IP address in order, for example, to reserve bandwidth, particularly at the radio interface, for specific services. The traffic which is intended for a secondary PDP context is in this case described by a traffic flow template. This is a parameter set which characterizes specific data streams and allows a packet distribution function 9 in the GGSN to classify the data packets appropriately and to allocate the respective data streams, that is (secondary) PDP contexts. The mobile terminal 7 identifies the presence of a second alternative mobile radio network 3 and decides to use it. To do this, the mobile terminal 7 sets up a connection to the access node 5 for the second mobile radio network 3. In the present case, the latter is a WLAN, and the access node 5 is in this case referred to as a local mobility agent (LMA). From there, it receives an IP address. The mobile terminal 7 signals to a packet distribution function 9 in the GGSN 4 that it wishes to provide the Internet service for its IP address IP-mt via the second mobile radio network 3. This can be done both via the 2G/3G mobile radio network 2 and via the WLAN 3. For signaling via the WLAN 3, the mobile terminal 7 signals a request using MIP or other protocols to the LMA 5, which converts this request to a so-called create PDP context request message. The mobile IP request may have a session-specific extension added to it in order to provide the LMA 5 with the required session parameters for setting up the PDP context from the LMA 5 to the GGSN 4. To do this, it indicates as destination addresses for the tunnel end points the GGSN 4 and its own address. In consequence, the connection is set up between the LMA 5 and the GGSN 4. Control messages from the 2G/3G mobile radio network 2 are used for signaling via the 2G/3G mobile radio network 2. The available mechanisms, for example an activate secondary PDP context, are extended to make it possible to transmit the address of the LMA 5 to the GGSN 4 and to indicate to a corresponding service network node in the 2G/3G mobile radio network 2 that no new context is intended to be set up. The GGSN 4 then sets up a new tunnel 6 to the LMA 5 with a corresponding tunnel endpoint address. This tunnel 6 can use the GTP protocol as an encapsulation technique, with this representing the lowest level of GGSN functions that need to be changed. The downlink traffic is then passed via the tunnel 6. End of service signaling can be carried out on the old data path 10 in order to simplify the data coordination in the mobile terminal 7. The GGSN 4 carries out the charging for the new data path, that is via the tunnel 6, as an extra, characterized, for example as a new QoS class. As soon as the new data path has been set up via the tunnel 6, it can also be used by the mobile terminal 7 for the uplink traffic. The LMA 5 tunnels all the uplink data to the GGSN 4. The mobile terminal 7 can be controlled by appropriate setting of a traffic flow template in order to determine whether all of the data or only a specific portion of the data is transmitted from the GGSN 4 to the terminal 7 via the mobile radio network 2.

In the second example, a packet distribution function 9 is provided in the GGSN 4 by means of an integrated home agent 9, which has a direct interface to the GPRS functions of the GGSN 4. The mobile terminal 7 is registered in the 2G/3G mobile radio network 2 and has set up at least one PDP context to an Internet service provider 8, from whose address book it receives an IP address (in the following text: IP-mt). This context is once again regarded as "always on", in order to ensure the accessibility of the mobile terminal 7 and in order to interchange at least signaling information for specific purposes with the Internet. The mobile terminal 7 can set up further secondary PDP contexts for the same IP address in order, for example, to reserve bandwidth, in particular at the radio interface, for specific services. The IP-mt is automatically entered as the home address in the integrated home agent 9. The mobile terminal 7 identifies the presence of a second alternative mobile radio network 3, and decides to use it. To do this, it sets up a connection to the LMA 5, from where it receives an IP address. The mobile terminal 7 signals to a packet distributor 9 and/or to the home agent 9 in the GGSN 4 that it wishes to provide the Internet service for its IP-mt via the LMA 5. This may be done both via the 2G/3G mobile radio network 2 and via the WLAN 3. The signaling via the WLAN 3 to the LMA 5 is carried out as already described in the first variant. Mobile IP is preferably used for the LMA 5 to the GGSN 4. During the signaling via the 2G/3G mobile radio network 2, an MIP request can be sent as normal L3 IP traffic, with the home agent address corresponding to the GGSN address. One advantage in this case over signaling via the WLAN 3 is that a protected and authenticated path is used. The GGSN 4 has to filter out MIP messages which are directed to it from the user data stream, and pass these to the internal home agent 9. Since the GGSN 4 carries out a test to determine whether the subscriber home address used in the MIP HA registration request matches the IP address of the PDP context being used, the authentication and authorization function is provided in a simple manner. In a situation where the signaling of the mobile terminal 7 took place via the WLAN 3, the GGSN 4 has to check whether there is a valid PDP context for the mobile terminal 7 and whether the mobile terminal 7, and hence its IP-mt, is authenticated and authorized to use a desired service. The mobile IP registration request should include not only the IP address but also further identities of the mobile subscriber, in order to prevent the IP address from being used by unauthorized subscribers. The integrated home agent 9 sets up an MIP tunnel 6 as a new data path to the LMA 5. The downlink traffic or specific data streams is or are then passed via this tunnel 6 on the basis of the traffic flow template. End of service signaling can be carried out on the old data path 10 in order to specify the data coordination in the mobile terminal 7. The GGSN 4 carries out the charging of the new data path, that is via the tunnel 6, as an extra, characterized, for example, as a new QoS class. As soon as the new data path has been set up via the tunnel 6, the mobile terminal 7 can also use it for the uplink traffic. The LMA 5 tunnels the uplink data to the GGSN 4. In addition to the function of a foreign agent, which de-encapsulates the downlink traffic, the LMA 5 also has to encapsulate the uplink traffic and send it in the tunnel 6 to the GGSN 4 or to the integrated home agent 9, in order to allow complete charging there. This function is referred to as reverse tunneling. At the same time, it has to prevent the mobile terminal 7 from carrying out route optimization and, in the process, allowing direct routing between the LMA 5 and a correspondent host 11 without passing through the GGSN 4 and the home agent 9. This can be achieved by the corresponding MIP messages being rejected or being negatively acknowledged by route optimization for the mobile terminal 7 by the LMA 5.

What is claimed is:

1. A heterogeneous mobile radio system for providing services from a packet data network for a mobile terminal, comprising:
   at least one first mobile radio network and one second mobile radio network, with the mobile radio networks each having at least one access network node to the packet data network, and the access to the packet data network indirectly via the access network node of the first mobile radio network;
   a first Packet Data Protocol (PDP) context of a General Packet Radio Service (GPRS) between the mobile terminal and the access network node of the first mobile radio network;
   a data tunnel to be set up by means of a secondary PDP context of GPRS between the access network node of the first mobile radio network and the access network node of the second mobile radio network, wherein incoming data traffic is distributed between the first and the second mobile radio network in the access network node of the first mobile radio network, by a packet distribution function for secondary PDP contexts of GPRS integrated in the access network node of the first mobile radio network.

2. The heterogeneous mobile radio network as claimed in claim 1, wherein the first mobile radio network is a 2G/3G mobile radio network, and/or the second mobile radio network is a local transmission network.

3. The heterogeneous mobile radio network as claimed in claim 2, wherein the data tunnel between the access node for the 2G/3G mobile radio network and the access node for the second mobile radio network is implemented based on existing protocols.

4. The heterogeneous mobile radio network as claimed in claim 3, wherein the data tunnel is implemented by a secondary PDP context.

5. The heterogeneous mobile radio network as claimed in claim 1, wherein the packet data network is the Internet.

6. A method for providing services from a packet data network for a mobile terminal in a mobile radio system, comprising:

providing at least one first and one second mobile radio network, each having at least one access network node to the packet data network;

combining the mobile radio networks such that data packets can be transported between the second mobile radio network and the packet data network indirectly via the access network node of the first mobile radio network;

setting up a first Packet Data Protocol (PDP) context of a General Packet Radio Service (GPRS) between the mobile terminal and the access network node of the first mobile radio network;

setting up a data tunnel by means of a secondary PDP context of GPRS between the access network node of the first mobile radio network and the access network node of the second mobile radio network; and distributing data traffic incoming in the access network node of the first mobile radio network between the first and the second mobile radio network, by a packet distribution function for secondary PDP contexts of GPRS integrated in the access network node of the first mobile radio network.

7. The method as claimed in claim 6, wherein charging for use of the second mobile radio network is carried out in the first mobile radio network.

8. The method as claimed in claim 6, wherein authentication and authorization of a subscriber for use of the second mobile radio network are carried out in the first mobile radio network.

* * * * *